Oct. 11, 1966
R. H. IMMEL
3,278,658
PROCESS AND APPARATUS FOR MAKING SHAPED CELLULAR
ARTICLES FROM EXPANDABLE THERMOPLASTIC RESINS
Filed Dec. 5, 1963
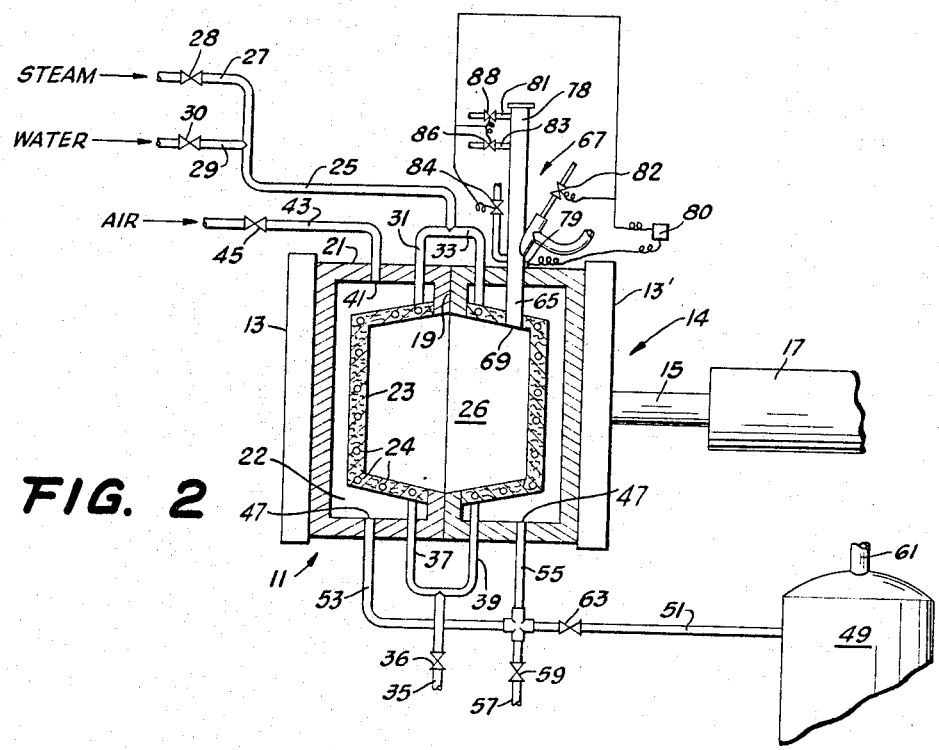
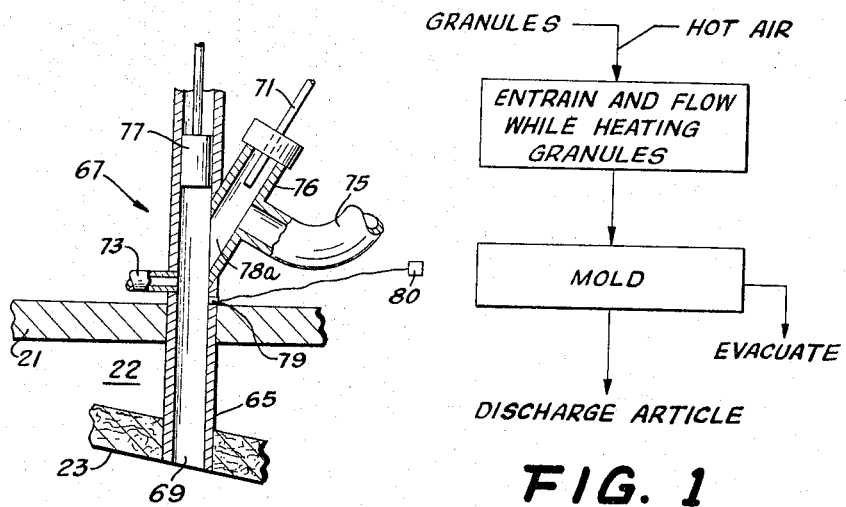
INVENTOR.
RICHARD H. IMMEL
BY Oscar B Brumback
his Attorney

United States Patent Office 3,278,658
Patented Oct. 11, 1966

3,278,658
PROCESS AND APPARATUS FOR MAKING SHAPED CELLULAR ARTICLES FROM EXPANDABLE THERMOPLASTIC RESINS
Richard H. Immel, Sewickley, Pa., assignor to Koppers Company, Inc., a corporation of Delaware
Filed Dec. 5, 1963, Ser. No. 328,305
11 Claims. (Cl. 264—51)

This invention relates generally to a method of forming shaped articles from granules of a thermoplastic material and, more particularly, to the rapid forming of shaped cellular articles from expandable granules of a thermoplastic resin.

The making of low density cellular shaped plastic articles from expandable granules or beads of thermoplastic material is well-known. Such granules generally contain either a liquid which boils below the softening point of the thermoplastic material or a chemical, or possibly a combination of chemicals, which will evolve gas when the granules are heated to their softening point. These granules are placed in a mold cavity which defines the shape of the desired finished article. Steam or other suitable heating media is then injected under pressure into the mold cavity to heat the beads or granules above their softening point and cause them to expand and completely fill the mold cavity and fuse together.

The foregoing process has worked well to produce a wide variety of articles. This process has disadvantages of being time consuming and when thick articles are made, great care must be exercised or a finished article of non-uniform density will result.

It has now been found that the tendency for the large density gradient existing in thick molded articles is due to the fact that as the heating medium is injected into the expandable beads from two or more sides of the mold cavity, the heat becomes concentrated in the center of the cavity causing the beads there to be heated to a higher temperature than the surrounding beads. Because of this, these beads tend to expand to a greater extent than those closer to the surface of the article. This effect is enhanced due to the fact that after the heating medium is cut off and the surface beads begin to cool, the center beads remain hot and continue to expand. This causes the central portion of an article of an average density of one pound per cubic foot to be as low as from 0.5 to 0.6 pound per cubic foot. Should the center of the article expand so that the density is less than .5 pound per cubic foot the center of the article will be weakened to such an extent that collapse of the article is likely to occur on cooling and this is believed to be the limiting factor in attempting to produce articles of minimum density.

Heretofore, to prevent the expansion of the central beads from causing the whole article to bulge out of shape, the article had to be kept in the mold until the center became cool enough so that it would no longer expand. This is time consuming since heat transfer through the article is extremely slow which is, in fact, one of the properties which makes these articles useful, for example, for insulation.

In accordance with this invention, shaped foamed cellular plastic articles of uniform and extremely low density are rapidly prepared by entraining granules of an expandable thermoplastic material in a heated gaseous medium, whereby the granules are heated above the softening point but below the temperature where substantial expansion takes place as the granules are carried into a space that essentially defines the shape of said article, and thereafter subjecting said granules in said space to a vacuum so that said granules expand to fill the space and fuse together.

The novel process of this invention has the advantage that the time cycle for the molding operation is not dependent on the size and shape of the article to be formed. The beads in a heated condition enter the mold so no additional heating time is required. No substantial temperature gradient is encountered. As a result, the finished article prepared by the novel process of this invention has a uniform density throughout. Thus, articles having average density of as low as approximately .5–.6 pound per cubic foot can be molded without fear of collapse.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

FIG. 1 is a flow diagram of the process,
FIG. 2 is a highly schematic vertical cross-section of an embodiment of the novel apparatus,
FIG. 3 is a vertical cross-section of the mold filling system with portions broken away.

The novel process of the invention for forming a shaped cellular plastic article is illustrated schematically by the flow diagram of FIG. 1. The expandable polymeric granules are entrained in hot air. Then, the air and entrained granules are flowed to the mold. During this flow, the expandable granules are heated to a temperature above the softening point of the thermoplastic material but below the temperature where substantial expansion takes place and before expansion occurs. In this condition, the particles enter the mold cavity that essentially defines the shape of the finished article. Thereafter, the granules are subjected to a vacuum whereupon the granules expand, coalesce, and fuse together to form a shaped foamed cellular mass. After the mass has cooled to a self sustaining surface temperature, it is removed from the mold as a finished article having a foamed structure of uniform density.

Mold 11 illustrated herein in FIG. 2 as having a substantially cubical shape is constructed as two sections. These are held in place in press 14 between platens 13 and 13'. Platen 13 is fixed and platen 13' is movable toward and away from platen 13 by means of rod 15 which is actuated by cylinder 17, so that the mold can be opened and closed. Gasketed lands in mold 11 form an airtight seal where the halves of mold 11 come together.

Mold 11 has an outer solid metal shell 21 and an inner shell 23 of perforated or porous metal connected to outer shell 21 by mold lands 19. The inner shell defines a mold cavity 26 and the inner and outer shells define a chest 22. Inner shell 23 contains imbedded coils 24 which are connected to sources of steam and water through lines 25, 27 and 29 and connection 31 and flexible connection 33. The flow of steam is controlled by valve 28 in line 27 and the flow of water is controlled by valve 30 in line 29. Coils 24 are connected to a drain line 35 by connection 37 and flexible connection 39. Drain line 35 can be closed by valve 36.

Outer shell 21 has an inlet 41 for compressed air connected to a source of compressed air by means of line 43, said air being controlled by valve 45, and ports 47 connected to vacuum tank 49 by means of line 51, connection 53 and flexible connection 55. Line 51 has a bleed line 57 for atmospheric air controlled by valve 59. Vacuum tank 49 can be isolated from mold 11 by closing valve 63 located in line 51 and is connected to a conventional vacuum source through line 61.

Inlet pipe 65 of blow fill gun 67, FIG. 3, passes through outer shell 21 to bead inlet 69 in inner shell 23. Aspirator 76 is connected to inlet pipe 65 of blow fill gun 67. Pipes 71 and 75 are connected to aspirator 76 so that a venturi chamber is formed at 78a. Pipe 71 is connected to a source of hot air under pressure and pipe 75 is connected to a heated container for granular polymeric material. Pipe 73 is connected to a source of cold air under pressure. Inlet pipe 65 is fitted with a piston 77 of suitable size and shape to close off bead inlet 69 which is actuated by a standard hydraulic ram 78, FIG. 2. The flow of air through lines 71, 73 and lines 81 and 83 of hydraulic ram 78 are controlled by conventional solenoid valves 82, 84, 86 and 88, FIG. 2.

A temperature sensing device 79 is located in pipe 65 opposite mold wall 21 and is connected to a temperature switch 80 which controls the operation of solenoid valves 82, 84, 86, 88 by conventional means well known in the art.

In practice, mold 11 is closed by platen 13' and rod 15 which is actuated by cylinder 17. Valve 36 on drain line 35 is closed and valve 28 to the steam supply which has a pressure of between 40 and 50 p.s.i.g. is opened to fill coils 24 with steam and preheat inner mold shell 23 to between 200 and 230° F. Then valve 28 is closed and drain valve 36 is opened. Mold 11 is now in closed position. Hot air at a temperature of from 400° to 750° F. and a pressure of from 15 to 70 p.s.i.g. is delivered by line 71 to aspirator 76 of blow fill gun 67 sucking granules through line 75 from a container heated from 150 to 170° F. The granules are entrained in the hot air and heated from 5 to 10° F. above the softening point of the polymer but below the point at which substantial expansion of the granules occur while they are carried through pipe 65 to bead inlet 69 into mold cavity 26. The hot air is vented from cavity 26 through porous shell 23 to chest 22 and out through connections 53 and 55 to bleed line 57 where it is vented to the atmosphere, valve 59 being opened and valve 63 being closed. When mold cavity 26 becomes filled, back pressure is created in pipe 65 causing the air temperature to rise which is sensed by temperature sensor 79 connected to temperature switch 80. Temperature switch 80 activates valve 82 closing off hot air line 71, and activates valve 84 opening cold air line 73 to deliver air at a pressure of from 20–30 p.s.i.g. and at a temperature of 70–85° F. for several seconds to blow the excess beads in pipe 65 back through pipe 75 to the bead container and to cool pipe 65 so that the beads around bead inlet 69 are not scorched by the rapid rise in temperature. Valve 88 on line 81 of hydraulic ram 78 is then activated causing piston 77 to close bead inlet 69. When bead inlet 69 is closed, valve 59 on atmospheric bleed line 57 is closed and valve 63 in pipe 51 leading to vacuum tank 49 is opened causing a sudden vacuum of from 28 to 30 inches of mercury inside mold 11 which results in expansion and fusion of the beads in mold cavity 26 to conform to the shape of mold shell 23. Valve 63 is then closed and valve 59 opened to allow the mold to return to atmospheric pressure. Drain valve 36 is opened and water valve 30 is opened to circulate water at a temperature of from 40 to 50° F. to coils 24 and cool inner shell 23 to a temperature of 150° to 180° F. Rod 15 is then actuated by cylinder 17 to open mold 11. Valve 45 in ejection air line 43 is opened so that the air pressure causes the finished article to be ejected from mold shell 23.

Either virgin polymer beads (beads which have not been expanded), or preexpanded beads (beads which have been partially expanded as, for example, described in United States Patent No. 3,023,175) advantageously are placed in a storage container maintained at a temperature of from 140 to 170° F. so that they can be quickly heated to fusion temperature while being carried into the mold by the hot air. The hot air is delivered to the venturi section of the blow fill gun under a pressure of from 15 to 70 p.s.i.g. as necessary depending on the efficiency of the venturi. The temperature required for the compressed hot air will depend upon its pressure since the temperature will drop adiabatically with the sudden pressure drop when the air enters the venturi section. The pressure will drop to from atmospheric pressure to 3 p.s.i.g., the higher pressure being due to back pressure from the mold cavity. The temperature of the compressed hot air is adjusted to heat the polymer beads being carried into the mold to a temperature of from 5–10° above their softening point. A compressed hot air temperature of 400° F. at pressure of 15 p.s.i.g. will give a hot air blow gun discharge temperature of approximately 270–300° F. at a pressure of 1 to 3 p.s.i.g. which is sufficient to heat the polymer beads to between 190 and 210° F. It has been found that at a hot air pressure of 70 p.s.i.g., a hot air temperature source of 750° F. is necessary to achieve a hot air blow fill gun discharge temperature of 300° F. at 3 p.s.i.g. One skilled in the art can readily determine at hot air pressures of between 15 and 70 p.s.i.g., the appropriate air temperature to give the desired blow gun discharge temperature. The blow gun discharge temperatures generally range from 250–350° F. A vacuum may be drawn during the mold filling operation to maintain the back pressure from 1 to 3 p.s.i.g.

The molding process is carried out at or below atmospheric pressure, so little pressure is needed to keep the mold closed and lightweight presses can be used. In practice, the closure pressure need not exceed about 5 p.s.i.g. This is advantageous, of course, as the mold itself can be constructed of lightweight materials.

The heating of inner shell 23 is optional, its function being to give a smooth surface on the finished article. Vacuum tank 49 should maintain a vacuum in the mold cavity of from 15–30 inches of mercury when the vacuum is drawn on the mold.

EXAMPLE I

Two halves of the mold were assembled in the press as indicated in FIG. 1 and the two halves brought together defining an inner mold cavity of approximately 11 x 11 x 11 inches. As the mold halves were closed, the walls of the mold cavity were heated by passing steam at 45 p.s.i.g. through the coils in the mold shell so that the shell was heated to a temperature from 215 to 220° F. Hot air at a pressure of 40 p.s.i.g. and a temperature of 600° F. was delivered to the blow fill gun aspirator where the pressure dropped to from 1 to 3 p.s.i.g. causing a corresponding temperature drop to from 270° F. to 300° F. The air passing through the venturi of the blow fill gun drew preexpanded (1 p.c.f.) polystyrene beads, sold under the trademark Dylite F-40, which had been preheated in the container to a temperature of 150 to 155° F. from the bead container. The entrained beads were heated by the hot air to a temperature of 202 to 208° F. as they were carried into the mold cavity by the hot air which escaped through the holes in the porous inner shell and was vented to the atmosphere through the bleed line. When the mold cavity was filled, which took approximately 10 seconds, the temperature switch was actuated by the temperature sensor. The switch shut off the hot air, turned on cold air which was at a pressure of 25 p.s.i.g. and which had a temperature of 80° F. to clear and cool the bead inlet passage, and thereafter actuated the piston which closed the bead inlet to the mold cavity. At this time the bleed valve was closed and the valve to the vacuum tank was opened so that the pressure in the mold cavity dropped almost instantaneously to between 2 and 4 inches of mercury causing the beads to expand and fuse. After approximately 5 seconds, the valve to the vacuum tank was closed and the bleed valve opened to allow the mold cavity to return to atmospheric pressure. This step took approximately 4 seconds. Cooling water at a temperature of 48 to 50° F. was passed through the coils in the mold shell so that the shell wall was cooled to a temperature from 160 to 165° F. After approximately 10 seconds from the time the mold was returned to atmospheric pressure the mold was opened and the molded block ejected. The block had a uniform density of about 1.0 p.c.f.

To illustrate the uniform density of the molded article, a one inch square core was taken through the block running from the center of one face to the center of the opposite face and compared with a similar core taken from a block molded by a conventional steam molding technique. The outer ¼" portions were cut away to partially eliminate the effects due to surface compression of the beads from the comparison.

Table I

| 1½ Inch Increments From Top to Bottom | Density of Block Formed in Example I (p.c.f.) | Density of Block Formed by Steam Molding (p.c.f.) |
|---|---|---|
| 1 | 1.16 | 1.36 |
| 2 | .96 | 1.14 |
| 3 | .96 | .78 |
| 4 | .96 | .67 |
| 5 | 1.02 | .84 |
| 6 | 1.04 | 1.18 |
| 7 | 1.18 | 1.27 |
| Average | 1.04 | 1.03 |

As can be seen from the table the density of the center increment (4) of the core taken from the block formed in Example I is only 0.08 p.c.f. less than the average density of the core (1.04 p.c.f.) and the maximum variation in density between increments 2 to 6 is likewise only 0.08 p.c.f. In comparison the density of the center increment (4) of the core taken from the block formed by the steam molding process is 0.36 p.c.f. less than the average density (1.03 p.c.f.) of the core and the maximum variation in density between increments 2 to 6 is 0.51 p.c.f. The end increments 1 and 7, whose density is still subject to surface effects even after eliminating ¼ inch on each end of the core, show considerably less variation in density from the center increment in the block prepared in Example I as compared with the block prepared by the steam molding process.

EXAMPLE II

The molding apparatus was set up in the same way as in Example I with the exception that the bead container was filled with beads of a copolymer of 75 percent by weight of styrene and 25 percent by weight of acrylonitrile which had been preexpanded to a density of 1 pound per cubic foot and which contained a low boiling petroleum ether fraction (boiling point 30–45° C.) as the propellant. The mold cavity wall was preheated to 165° F., hot air at a temperature of 420° F. and a pressure of 15 p.s.i.g. was delivered to the blow fill gun which entrained the beads and carried them into the mold cavity. The beads were heated to a temperature from 205 to 210° F. The mold filling time was 12 seconds after which the temperature switch was activated which stopped the flow of hot air, turned on the cold air which was at a pressure of 25 p.s.i.g. and which had a temperature of 80° F. blowing the excess beads in the bead inlet passage back to the bead container and preventing scorching of the beads around the bead inlet, and actuated the piston which closed the bead inlet to the mold cavity. The bleed valve was closed and the valve to the vacuum tank opened causing the pressure in the mold to drop to 1–2 inches of mercury. After 5 seconds, the valve to the vacuum tank was shut off and the bleed valve opened permitting the mold cavity to return to atmospheric pressure. The cooling water valve to the coils in the mold wall was opened circulating water at 48–50° F. through the coils for 12 seconds which reduced the mold wall temperature to 160° F.–165° F. after which the cooling water was shut off and the drain valve opened. The press was then opened and the finished molded block ejected from the mold. The block had a uniform density of 1 pound per cubic foot.

EXAMPLE III

A comparison of typical mold cycle times for the novel process of this invention carried out in accordance with the procedure of Example I as contrasted with the conventional steam injection process used heretofore is illustrated below in Table II.

Table II

VACUUM FUSION PROCESS

[Typical time cycles. (1.0 p.c.f. preexpanded polystyrene beads)]

| Operation | Vacuum Process, Seconds | Conventional Steam Injection Process, Seconds |
|---|---|---|
| Close Mold | 5 | 5 |
| Preheat | (¹) | 20 |
| Mold Fill | 10 | 10 |
| Fusion | 5 | 15 |
| Return to Atmosphere | 5 | |
| Cooling | 0–15 | 600 |
| Open and Eject | 5 | 5 |
| Total Time | 30–45 | 655 |

¹ Preheating done during mold closing.

As can be seen from the table considerable savings in time are achieved since the preheating step is accomplished during the mold closing operation and the cooling cycle time is either eliminated or greatly reduced. The molding operation is accomplished in only 5 to 7 percent of the time required by the conventional steam injection process.

Expandable polymers suitable for use in making cellular articles in accordance with this invention include a variety of homopolymers and copolymers derived from vinyl monomers including styrene, vinyl chloride, divinyl benzene, alpha-methyl styrene, nuclear dimethyl styrenes, vinyl naphthalene, etc. Particular polymers that are useful are polystyrene and its copolymers with such monomers as butadiene, alpha-methyl styrene, divinyl benzene, isobutylene and acrylonitrile. These expandable materials have incorporated therein as a propellant a volatile organic fluid in an amount of from 3 to 35 parts by weight of the polymer such as saturated aliphatic hydrocarbons containing from 4–7 carbon atoms in the molecule, for example, butane, pentane, hexane, heptane, cyclohexane or halogenated derivatives of methane and ethane which boil below 95° C. Other suitable propellants include water or a combination of chemicals which will evolve a gas such as carbon dioxide, water vapor or nitrogen when heated to a temperature at or below the softening point of the polymer, for example sodium bicarbonate and citric acid.

The practice of the invention permits shaped foamed cellular plastic articles having a uniform density throughout to be molded quickly regardless of size and shape. This has reduced costs by increasing the production rate. It also has enhanced product quality and permitted the formation of very low density foamed articles without fear of collapse. Since the mechanical forces on the mold are only those required to open and close the mold, lightweight presses are used as well as lightweight molds which has resulted in lower initial equipment costs. Other advantages result from the fact that the process is completely dry, resulting in a dry molded article. The invention also easily lends itself to a completely automated system from the pouring of virgin beads into an expander to the removal of a finished molded article.

I claim:
1. A method of forming a shaped foamed cellular thermoplastic article comprising forming an entrainment of granules of an expandable thermoplastic material in a substantially dry heated gaseous medium, flowing said entrainment into a space that defines the shape of said article while heating said granules to a temperature above the softening point of the thermoplastic material but below the temperature where substantial expansion takes place as the granules flow to said space, thereafter subjecting said granules in said space to a vacuum so that said granules expand and fuse together to form a cellular plastic article conforming to said space, and then removing the article from said space.

2. A method of forming a shaped foamed cellular thermoplastic article from partially expanded granules of an expandable thermoplastic material comprising, flowing particles with a substantially dry heated gaseous medium into a space that defines the shape of said article so that said granules enter said space at a temperature above the softening point of the thermoplastic material but below the temperature where substantial expansion takes place, thereafter subjecting said granules in said space without further heating to a vacuum to expand and fuse said granules together to form said foamed cellular plastic article conforming to the shape of said space, and then removing the article from said space.

3. A method of forming a shaped formed cellular thermoplastic article comprising forming an entrainment of granules of an expandable thermoplastic material in a substantially dry heated gaseous media to heat said granules to a temperature above the softening point of the thermoplastic material but below the temperature where substantial expansion takes place flowing said entrainment into a preheated space that defines the shape of said article whereby the granules enter said space in a heated condition and no substantial temperature gradient is encountered, thereafter, without additional heating, subjecting said granules in said space to a vacuum to expand and fuse said granules together to form a cellular plastic article conforming to said space, and then removing the article from said space.

4. A method of forming a shaped foamed cellular thermoplastic article from partially expanded granules of an expandable thermoplastic material which comprises
heating said granules by means of a substantially dry heated gaseous medium to a temperature above the softening point of the thermoplastic material but below the temperature where substantial expansion takes place while flowing said granules to a mold, and
subjecting said granules in said mold to a vacuum to expand and fuse said granules to form said cellular thermoplastic article,
said process being characterized by the omission of further increase in temperature of the granules in said mold.

5. A method of forming a shaped foamed cellular thermoplastic article from granules of an expandable thermoplastic material which comprises
heating said granules by means of a substantially dry heated gaseous medium to a temperature of from 5–10° C. above the softening point of the thermoplastic material but below the temperature where substantial expansion takes place while flowing said granules to a mold, and
subjecting said granules in said mold to a vacuum of from 15 to 30 inches of mercury to expand and fuse said granules to form said cellular thermoplastic article,
said process being characterized by the omission of further increase in temperature of the granules in said mold.

6. Method of forming a shaped foamed cellular thermoplastic article comprising forming an entrainment of granules of an expandable thermoplastic material in hot air at a preheated temperature of from 250° to 350° F., flowing said entrainment into a space that defines the shape of said article whereby the granules and air exchange heat during the flow to said space and said granules are heated to a temperature from 5° to 10° F. above the softening point of the thermoplastic material thereafter subjecting said granules in said space to a vacuum of 15 to 30 inches of mercury so that said granules expand and fuse together to form a cellular plastic article conforming to said space and then removing the article from said space.

7. An apparatus for forming a shaped, foamed, cellular plastic article comprising a mold having a cavity that essentially defines the shape of said article, transfer means for forming an entrainment of expandable granules of a thermoplastic material in a substantially dry heated gaseous medium and flowing said entrainment into said mold whereby said granules in said entrainment are heated to a temperature above the softening point of said thermoplastic material but below the temperature where substantial expansion of said granules takes place as the granules flow to the mold, means for subjecting said granules in said mold to a vacuum so that said granules expand and fuse together to form a foamed article, and means for removing said article from said mold.

8. The apparatus of claim 1 wherein said mold is divided into two sections each of said sections comprising
  (a) a solid metal outer shell, said shell having lands capable of forming an air tight seal when said sections are brought together;
  (b) a sintered metal inner shell shaped to define one part of a mold cavity connected in spaced relationship to said outer shell so as to define a chest between said inner shell and said outer shell;
  (c) outlet means from said chest through said outer shell for connection to vacuum and atmospheric air lines;
  (d) means embedded in the walls of said inner shell for circulating cooling and heating media through said walls;
  (e) inlet and outlet means for said cooling and heating media;
at least one of said sections comprising
  (a) inlet means for the passage of beads into the mold cavity formed when said sections are brought together;
  (b) means for closing said inlet means when the mold is filled;
  (c) inlet means for the passage of compressed air to eject the molded article from said section
and means for opening and closing said mold by moving one of said sections relative to the other.

9. The apparatus of claim 8 wherein said means for forming and flowing an entrainment of expandable granules of a thermoplastic material in a substantially dry heated gaseous medium into said mold is a blow fill gun comprising an aspirator containing as an integral part thereof a venturi chamber and having a first inlet for the passage of said granules into said aspirator, a second inlet for the passage of hot air under pressure into said aspirator, an outlet for a mixture of said granules and said air whereby said air under pressure passing through said venturi chamber sucks said granules through said first inlet into said aspirator and ejects said granules and said air from said outlet at a high velocity, vertically extending hollow connecting means for connecting said outlet with said mold cavity, inlet means in said connecting means for the passage of cold air under pressure whereby excess granules are removed from said connecting means and said aspirator when said mold cavity becomes filled with granules, closure means positioned in said connecting means for closing the inlet to said mold cavity when said cavity becomes filled with granules and temperature sensing means in said connecting means for activating control means for said hot air under pressure, said cold air under pressure, and said closure means whereby the filling of said mold, the removal of the excess beads from said connecting means and said aspirator, and the closing of said mold cavity occur in sequence.

10. Apparatus for forming a shaped foamed cellular thermoplastic article comprising a mold having an internal configuration corresponding to that of the article, a means for subjecting said mold to vacuum, a supply source for granules of expandable thermoplastic material, a supply source for heated air, means connected with said supplies for entraining said granules in said air and means for flowing the granules to said mold, a temperature sensor for responding to the temperature of said entrainment when said mold is filled with said granules and connected to means for stopping the flow of said entrainment.

11. Apparatus for forming a shaped foamed cellular thermoplastic article comprising a mold having an internal configuration corresponding to that of the article, a means for subjecting said mold to vacuum and means for forming an entrainment of granules of expandable thermoplastic material in hot air and flowing said entrainment to the mold comprising a conduit leading to said mold, an aspirator for introducing said granules into said conduit, a source of hot air, means connecting said source of hot air to said aspirator for the operation thereof, a temperature sensor responsive to the temperature of said entrainment of beads in air effected by said aspirator, and means responsive to said temperature sensor for stopping the flow of air and beads to said mold, said last named means including a valve for stopping the flow of hot air to said aspirator, a piston in said conduit, and means to drive said piston in a direction to close said conduit when the mold is filled with granules.

References Cited by the Examiner
UNITED STATES PATENTS

| | | | |
|---|---|---|---|
| 3,015,851 | 1/1962 | Wiles | 264—53 |
| 3,065,500 | 11/1962 | Berner | 264—126 XR |
| 3,086,248 | 4/1963 | Culp | 264—101 XR |
| 3,139,466 | 6/1964 | Couchman | 264—53 XR |
| 3,162,704 | 12/1964 | Attanasio et al. | 264—53 |
| 3,167,811 | 2/1965 | Kraus et al. | 264—53 XR |
| 3,202,734 | 8/1965 | Young | 264—53 |

ALEXANDER H. BRODMERKEL, *Primary Examiner.*

P. E. ANDERSON, *Assistant Examiner.*

UNITED STATES PATENT OFFICE
CERTIFICATE OF CORRECTION

Patent No. 3,278,658                     October 11, 1966

Richard H. Immel

It is hereby certified that error appears in the above numbered patent requiring correction and that the said Letters Patent should read as corrected below.

Column 7, line 66, strike out "preheated"; line 67, after "a" insert -- preheated --; column 8, line 15, for the claim reference numeral "1" read -- 7 --.

Signed and sealed this 29th day of August 1967.

(SEAL)
Attest:

ERNEST W. SWIDER                     EDWARD J. BRENNER
Attesting Officer                      Commissioner of Patents